United States Patent
Moss et al.

(10) Patent No.: US 11,034,385 B2
(45) Date of Patent: Jun. 15, 2021

(54) LOAD PATH GEOMETRY FOR VEHICLE STRUCTURE

(71) Applicant: GM GLOBAL TECHNOLOGY OPERATIONS LLC, Detroit, MI (US)

(72) Inventors: Edward D. Moss, Commerce Township, MI (US); Mark J. McGuire, Amherstburg (CA); Peter M. Parlow, Columbus, MI (US); Robert M. Kielbik, Chesterfield Township, MI (US); Joshua Holder, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 95 days.

(21) Appl. No.: 16/514,152

(22) Filed: Jul. 17, 2019

(65) Prior Publication Data

US 2021/0016840 A1 Jan. 21, 2021

(51) Int. Cl.
| | |
|---|---|
| *B62D 21/15* | (2006.01) |
| *B62D 25/08* | (2006.01) |
| *B62D 27/02* | (2006.01) |
| *B62D 65/02* | (2006.01) |
| *B62D 29/04* | (2006.01) |

(52) U.S. Cl.
CPC ......... *B62D 21/152* (2013.01); *B62D 25/088* (2013.01); *B62D 27/023* (2013.01); *B62D 65/02* (2013.01); *B62D 29/048* (2013.01)

(58) Field of Classification Search
CPC ...... B62D 21/11; B62D 25/08; B62D 25/085; B62D 25/088; B62D 29/008; B62D 65/02; B62D 65/024

USPC ......................... 296/203.01, 203.02, 203.04
See application file for complete search history.

(56) References Cited

U.S. PATENT DOCUMENTS

| | | | | |
|---|---|---|---|---|
| 5,344,187 A * | 9/1994 | Kreis | ................... | B60G 15/068 |
| | | | | 280/124.155 |
| 5,346,276 A * | 9/1994 | Enning | ................ | B62D 25/082 |
| | | | | 296/187.09 |
| 7,703,805 B2 * | 4/2010 | Sasaki | ................... | B62D 29/008 |
| | | | | 280/784 |
| 9,517,796 B2 * | 12/2016 | Balzer | .................... | B62D 27/02 |
| 10,286,961 B2 * | 5/2019 | Hillebrecht | ........... | B22F 3/1055 |
| 2006/0027993 A1 * | 2/2006 | Takayanagi | .......... | B62D 25/088 |
| | | | | 280/124.166 |

(Continued)

*Primary Examiner* — Jason S Daniels
(74) *Attorney, Agent, or Firm* — Quinn IP Law (57) ABSTRACT

A load impact management system for a vehicle includes a plurality of cross-vehicle support members extending from a first side of the vehicle to a second side of the vehicle opposite the first side of the vehicle, a shock tower spaced apart from the plurality of cross-vehicle support members and fixed to the vehicle frame rail, a first structural member extending along a first plane, a second structural member extending along a second plane separate from the first plane, and a third structural member extending along a third plane separate from the first and second planes. The first structural member defines a first load path between the center tunnel and the shock tower, the second structural member defines a second load path between the center tunnel and the shock tower, and the third structural member defines a third load path between the center tunnel and the vehicle frame rail.

20 Claims, 6 Drawing Sheets

(56) References Cited

U.S. PATENT DOCUMENTS

2015/0076867 A1\* 3/2015 Bechtler .............. B62D 25/088
                                                            296/203.02
2020/0039586 A1\* 2/2020 Ayuzawa ............. B62D 27/065
2020/0189663 A1\* 6/2020 Kaneb ................... F16F 9/3271

\* cited by examiner

LOAD PATH GEOMETRY FOR VEHICLE STRUCTURE

INTRODUCTION

The present disclosure relates generally to a six rail load path for a vehicle structure and means for transfer of resistance load between a central tunnel structural member to rear shock members of the vehicle.

Vehicle manufacturers use a variety of structures and components to transfer energy throughout the vehicle structure to protect the vehicle components and a vehicle's occupants during a collision. Light-duty vehicles, such as a majority of passenger cars, often employ a monocoque or unibody construction that eschews a separate body and frame, in favor of a lighter, integrated structure. Additionally, some lighter-duty vehicles employ a combination or semi-monocoque structure with a subframe for carrying the vehicle's powertrain and other components. Frequently, additional structural members are used to buttress the vehicle body structure, as well as for supporting various chassis and powertrain subsystems.

An integral frame and body construction requires more than simply attaching an unstressed body to a conventional frame. In a fully integrated body structure, the entire vehicle is a load-carrying unit that handles all the loads experienced by the vehicle, such as forces from driving and cargo. Integral-type bodies for wheeled vehicles are typically manufactured by welding preformed metal panels and other components together, by forming or casting whole sections as one piece, or by a combination of these techniques. An integral frame and body construction is generally lighter and more rigid than a vehicle having a separate body and frame.

In unibody vehicle construction, the frame, the exterior shell, and the chassis are made as a single structure, with box sections, bulkheads, and tubes providing additional rigidity, while the skin adds relatively little strength or stiffness. A true monocoque frame is basically a "skin" that supports various loads by distributing tension and compression across its surface and lacks a load-carrying internal frame. Although such a structure is sometimes also referred to as monocoque, because the vehicle's outer skin and panels are made loadbearing, there are still ribs, bulkheads and box sections to reinforce the body, making the description semi-monocoque more appropriate.

SUMMARY

Embodiments according to the present disclosure provide a number of advantages. For example, embodiments according to the present disclosure enable efficient means of transfer of twisting resistance load between the rear shock interface and a closed section center tunnel of the vehicle body structure.

In an exemplary embodiment of the present disclosure, a structural arrangement for a vehicle includes a vehicle frame including a vehicle frame rail and a center tunnel defining a vehicle body axis, a bulkhead arranged transverse to the vehicle body axis, the bulkhead coupled to the center tunnel, and a shock tower spaced apart from the bulkhead and fixed to the vehicle frame rail. The structural arrangement further includes a first structural member extending from the bulkhead to the shock tower and fixed to each of the bulkhead and the shock tower, the first structural member extending along a first plane, a second structural member extending from the bulkhead to the shock tower and fixed to each of the bulkhead and the shock tower, the second structural member extending along a second plane separate from the first plane, and a third structural member extending from the center tunnel to the vehicle frame rail and fixed to each of the center tunnel and the vehicle frame rail, the third structural member extending along a third plane separate from the first and second planes. The first structural member defines a first load path between the center tunnel and the shock tower, the second structural member defines a second load path between the center tunnel and the shock tower, and the third structural member defines a third load path between the center tunnel and the vehicle frame rail.

In some aspects, the vehicle frame rail includes a first frame rail and a second frame rail spaced apart from and parallel to the first frame rail and each of the first and second frame rails extend parallel to the vehicle body axis.

In some aspects, the shock tower includes a first shock tower and a second shock tower, and the first shock tower is spaced apart from the bulkhead and fixed to the first frame rail and the second shock tower is spaced apart from the bulkhead and fixed to the second frame rail.

In some aspects, the first structural member includes a first upper structural member extending from the bulkhead to the first shock tower and fixed to each of the bulkhead and the first shock tower and a second upper structural member extending from the bulkhead to the second shock tower and fixed to each of the bulkhead and the second shock tower.

In some aspects, the second structural member includes a first middle structural member extending from the bulkhead to the first shock tower and fixed to each of the bulkhead and the first shock tower and a second middle structural member extending from the bulkhead to the second shock tower and fixed to each of the bulkhead and the second shock tower.

In some aspects, the third structural member includes a first lower structural member extending from the center tunnel to the first frame rail and fixed to each of the center tunnel and the first frame rail and a second lower structural member extending from the center tunnel to the second frame rail and fixed to each of the center tunnel and the second frame rail.

In some aspects, the center tunnel is a closed section center tunnel.

In some aspects, each of the first, second, and third structural members is an extruded tubular member.

In some aspects, the shock tower is a high-integrity aluminum die-casting.

In an exemplary embodiment of the present disclosure, an automotive vehicle includes a vehicle body structure having a vehicle body axis, a center tunnel, a bulkhead coupled to the center tunnel, and a vehicle frame rail coupled to the center tunnel, the center tunnel and the vehicle frame rail arranged along the vehicle body axis, a first cross-vehicle member and a second cross-vehicle member arranged orthogonally relative to the vehicle body axis and the center tunnel, each of the first and second cross-vehicle members coupled to the bulkhead, and a shock tower spaced apart from the first and second cross-vehicle members and coupled to the vehicle frame rail. The vehicle further includes a load transfer system. The load transfer system includes a first structural member extending from the first cross-vehicle member to the shock tower and fixed to each of the first cross-vehicle member and the shock tower, the first structural member extending along a first plane, a second structural member extending from the second cross-vehicle member to the shock tower and fixed to each of the second cross-vehicle member and the shock tower, the second structural member extending along a second plane separate from the first plane, and a third structural member extending from the center tunnel to the vehicle frame rail and fixed to each of the center tunnel and the vehicle frame rail, the third structural member extending along a third plane separate from the first and second planes.

In some aspects, the first structural member defines a first load path between the center tunnel and the shock tower, the second structural member defines a second load path between the center tunnel and the shock tower, and the third structural member defines a third load path between the center tunnel and the vehicle frame rail.

In some aspects, the vehicle frame rail includes a first frame rail and a second frame rail spaced apart from and parallel to the first frame rail and each of the first and second frame rails extend parallel to the vehicle body axis.

In some aspects, the shock tower includes a first shock tower and a second shock tower, and the first shock tower is spaced apart from the bulkhead and fixed to the first frame rail and the second shock tower is spaced apart from the bulkhead and fixed to the second frame rail.

In some aspects, the first structural member includes a first upper structural member extending from the first cross-vehicle member to the first shock tower and fixed to each of the first cross-vehicle member and the first shock tower and a second upper structural member extending from the first cross-vehicle member to the second shock tower and fixed to each of the first cross-vehicle member and the second shock tower.

In some aspects, the second structural member includes a first middle structural member extending from the second cross-vehicle member to the first shock tower and fixed to each of the second cross-vehicle member and the first shock tower and a second middle structural member extending from the second cross-vehicle member to the second shock tower and fixed to each of the second cross-vehicle member and the second shock tower.

In some aspects, the third structural member includes a first lower structural member extending from the center tunnel to the first frame rail and fixed to each of the center tunnel and the first frame rail and a second lower structural member extending from the center tunnel to the second frame rail and fixed to each of the center tunnel and the second frame rail.

In some aspects, the first middle structural member and the second middle structural member are configured as a primary fuel tank support structure.

In some aspects, the center tunnel is a closed section center tunnel and each of the first, second, and third structural members are extruded tubular members.

In some aspects, the shock tower is a high-integrity aluminum die-casting.

In an exemplary embodiment of the present disclosure, a load impact management system for a vehicle having a vehicle frame including a vehicle frame rail and a center tunnel defining a vehicle body axis includes a plurality of cross-vehicle support members extending from a first side of the vehicle to a second side of the vehicle opposite the first side of the vehicle and a shock tower spaced apart from the plurality of cross-vehicle support members and fixed to the vehicle frame rail. The load impact management system also includes a first structural member extending from one of the plurality of cross-vehicle support members to the shock tower, the first structural member extending along a first plane, a second structural member extending from one of the plurality of cross-vehicle support members to the shock tower, the second structural member extending along a second plane separate from the first plane, and a third structural member extending from the center tunnel to the vehicle frame rail, the third structural member extending along a third plane separate from the first and second planes. The first structural member defines a first load path between the center tunnel and the shock tower, the second structural member defines a second load path between the center tunnel and the shock tower, and the third structural member defines a third load path between the center tunnel and the vehicle frame rail.

In some aspects, the plurality of cross-vehicle support members includes a first cross-vehicle support member, a second cross-vehicle support member parallel to the first cross-vehicle support member, and a third cross-vehicle support member parallel to each of the first and second cross-vehicle support members, the first, second, and third cross-vehicle support members forming a tiered structure connecting the first side of the vehicle with the second side of the vehicle.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description fix the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
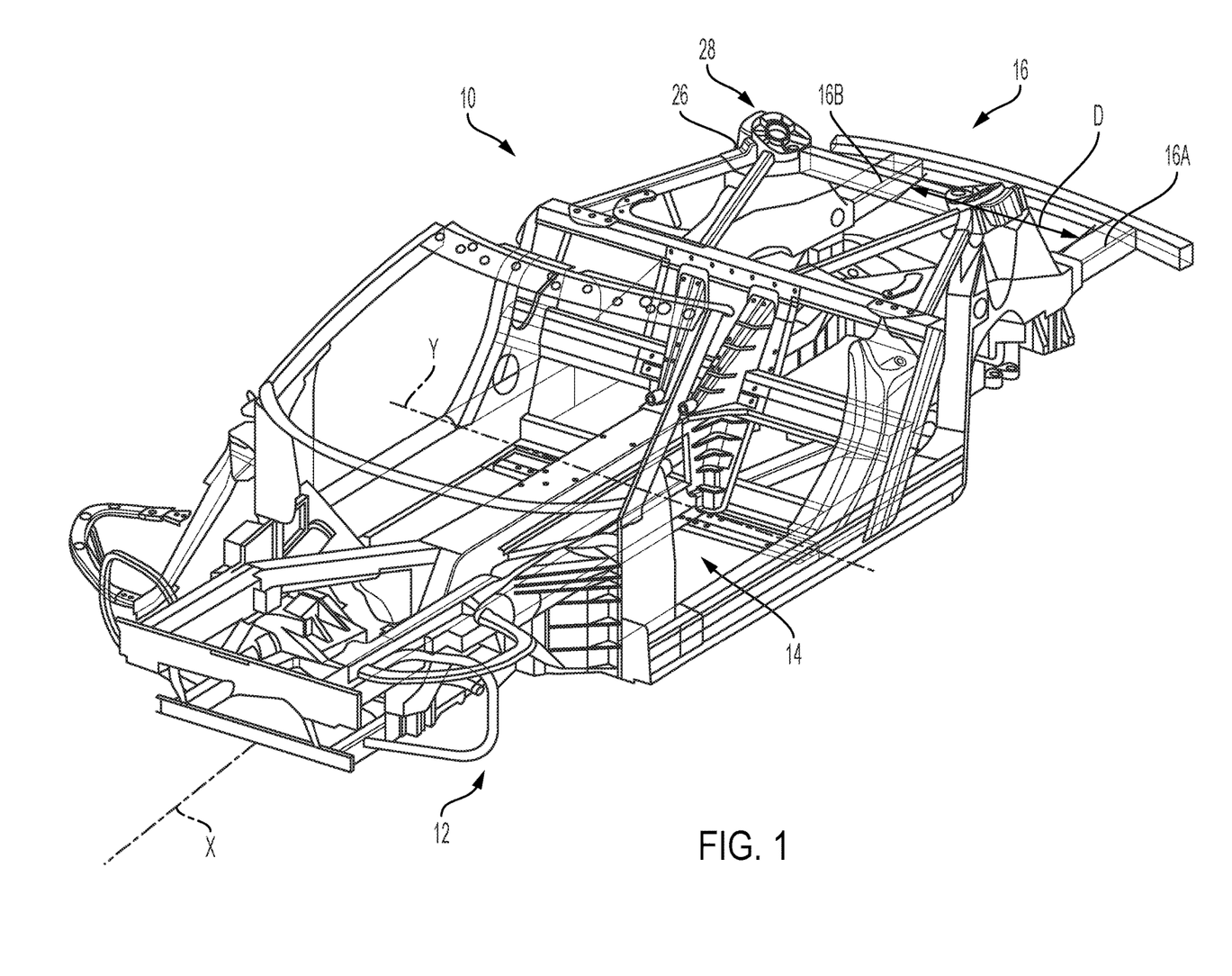
FIG. 1 is a schematic front perspective partial view of an integrated vehicle body structure having a vehicle load path to a shock tower system with shock towers, according to an embodiment.

Referring to the drawings, wherein like reference numbers refer to like components, FIG. 1 is a perspective schematic outline of a vehicle 10 having a vehicle body structure 12. The vehicle body structure 12 is made up of a vehicle body 14 constructed from a number of components, such as exterior body panels (not shown), sub-structures, and a frame 16. The vehicle body 14 is characterized by a longitudinal vehicle centerline or vehicle body axis that generally coincides with an X-axis and is orthogonal to a Y-axis (shown in FIG. 1).

The vehicle body 14 is attached to a frame 16, thus enabling a support structure for a vehicle suspension and wheels (not shown), while also supporting vehicle subsystems, such as a steering system, a powertrain, passengers, and cargo (not shown). As shown in FIG. 1, the frame 16 is arranged in the general plane of the vehicle 10, substantially defined by the X and Y axes. As appreciated by those skilled in the art, the disclosed vehicle body structure 12 may be used in a rear-wheel drive, a front-wheel drive, or a four-wheel drive configuration.

With continued reference to FIG. 1, the frame 16 includes two frame rails, 16A and 16B, separated in the vehicle body structure 12 by a distance D. The frame rails 16A and 16B may be substantially parallel with respect to each other, e.g., within +/−5° of true parallel, and arranged substantially along the vehicle body axis. In various embodiments, the frame rails 16A, 16B may be configured as partial rails that exclude the dashed line sections, thereby defining an integral body and frame structure. Such an integral vehicle body structure 12 lacks a separate load-carrying internal frame, and may have either a "unibody" or a "semi-monocoque" construction, as identified in the art. In the unibody construction, the frame, the floor plan, and the chassis are typically combined into a single structure which uses box sections, bulkheads, and tubes to provide most of the strength of the vehicle body, while exterior body panels add a relatively little strength or stiffness. Similar to the unibody structure, a semi-monocoque construction is an integrated structure employs ribs, bulkheads, and box sections to reinforce the vehicle body, while the outer body panels bear a smaller portion of the structural load.

The first and second frame rails 16A, 16B are arranged substantially symmetrically with respect to the longitudinal vehicle centerline or the X-axis. As used herein, the term "substantially symmetrically" may denote a positioning of specified components that is within +/−5 cm of true symmetry with respect to the longitudinal vehicle centerline. The first and second frame rails 16A, 16B may be constructed from aluminum and be formed by one or more appropriate methods, such as extrusion, hydroforming, roll-forming, stamping, and joined by welding, bonding, or mechanical fasteners.

Figure 2:
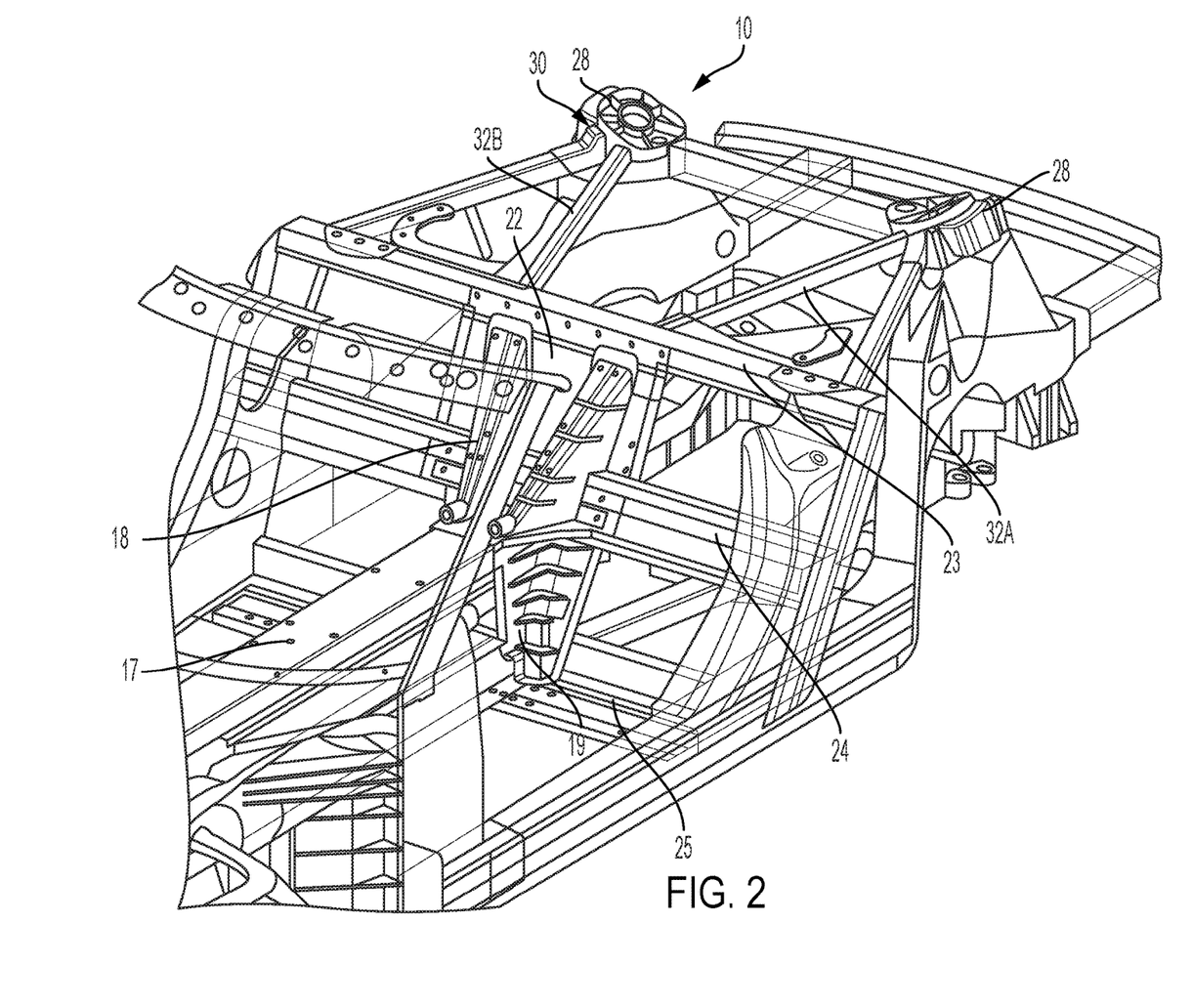
FIG. 2 is another schematic front perspective partial view of an integrated vehicle body structure having a vehicle load path to a shock tower system with shock towers, according to an embodiment.

With continued reference to FIGS. 1 and 2, the vehicle body structure 12 includes a closed section center tunnel 17. The center tunnel 17 extends substantially along and defines the longitudinal vehicle centerline illustrated by the X-axis and connects the forward section of the vehicle 10 with the rear section of the vehicle 10.

As may be seen in FIGS. 1 and 2, the vehicle body structure 12 also includes a bulkhead 22. The bulkhead 22 is arranged orthogonally relative to the vehicle frame rails 16A and 16B and the center tunnel 17. The bulkhead 22 is coupled to both the vehicle frame rails 16A, 16B and the center tunnel by welding, bonding, or any other mechanical fastening method. The bulkhead 22 is arranged transverse to the vehicle body axis X and may be configured as a load-bearing component connecting the vehicle frame rails 16A and 16B in either a unibody or a semi-monocoque construction.

An upper bulkhead support member 18 is arranged orthogonally to the center tunnel 17. In various embodiments, the upper bulkhead support member 18 is substantially wedge-shaped and provides support to and an attachment surface for the bulkhead 22. A pair of lower bulkhead support members 19 (one shown) are also arranged orthogonally to the center tunnel 17 and are positioned below the upper bulkhead support member 18 on either side of the center tunnel 17. In various embodiments, the upper and lower bulkhead support members 18, 19 are high integrity die castings, as discussed herein, and are coupled to the center tunnel 17 and to the bulkhead 22 using one or more fasteners and/or an adhesive.

A plurality of cross-vehicle support members 23, 24, 25 extend perpendicular to the longitudinal vehicle centerline indicated by the X-axis. As shown in FIG. 2, the cross-vehicle support members 23, 24, 25 are vertically separated from one another and define three separate cross-vehicle load paths to distribute side impact loads. In various embodiments, one or more of the cross-vehicle support members 23, 24, 25 are coupled to the bulkhead 22 and/or one of the bulkhead support members 18, 19.

With continued reference to FIGS. 1 and 2, the vehicle body structure 12 also includes a vehicle body-variant adaptable structural shock tower system. The shock tower system may be arranged proximate the rear of the vehicle body structure 12. The shock tower system includes a pair of shock towers 26, each configured to support a vehicle shock assembly (not shown). Each shock tower 26 is spaced apart from the bulkhead 22 and fixed to the respective vehicle frame rail 16A or 16B. An individual shock tower 26 may be attached to the respective vehicle frame rail 16A or 16B via a weld(s), fastener(s), and/or an adhesive. Alternatively, an individual shock tower 26 may be formed integrally with the respective vehicle frame rail 16A or 16B, such as in a single or unitary casting.

The shock tower system also includes a shock tower cap 28 arranged on each shock tower 26. Each shock tower cap 28 defines a plurality of receivers 30. The receivers 30 may be defined as pockets or recesses configured to accept structural members that define a load path linking the center tunnel 17 and the shock tower 26.

The shock tower 26 may be formed as a high-integrity aluminum die-casting, specifically from aluminum-silicone or aluminum-magnesium-silicone using a vacuum casting process. Generally, aluminum die-castings are susceptible to defects and inconsistencies, such as gas porosity, shrinkage porosity, oxide or other inclusions, and incomplete die fill. Such defects may negatively impact the finished component reliability and strength. A particular "high-integrity" die-casting process, where vacuum is generated in, i.e., the air is pulled out of, the die cavity with the aid of a controlled vacuum valve (not shown), maybe used to address such potential defects in aluminum die-castings. Specifically, the vacuum generated in the die may be in a range of 20-300 mbar. Some aluminum alloys are particularly well suited to the high-integrity die-casting process, such as aluminum-silicone and aluminum-magnesium-silicone families of alloys, where silicone and magnesium are used to enhance mechanical properties of the casting. In other words, the shock tower 26 may be formed using the vacuum die casting process, thereby resulting in a component having low porosity, high elongation, and consistent properties.

Figure 3:
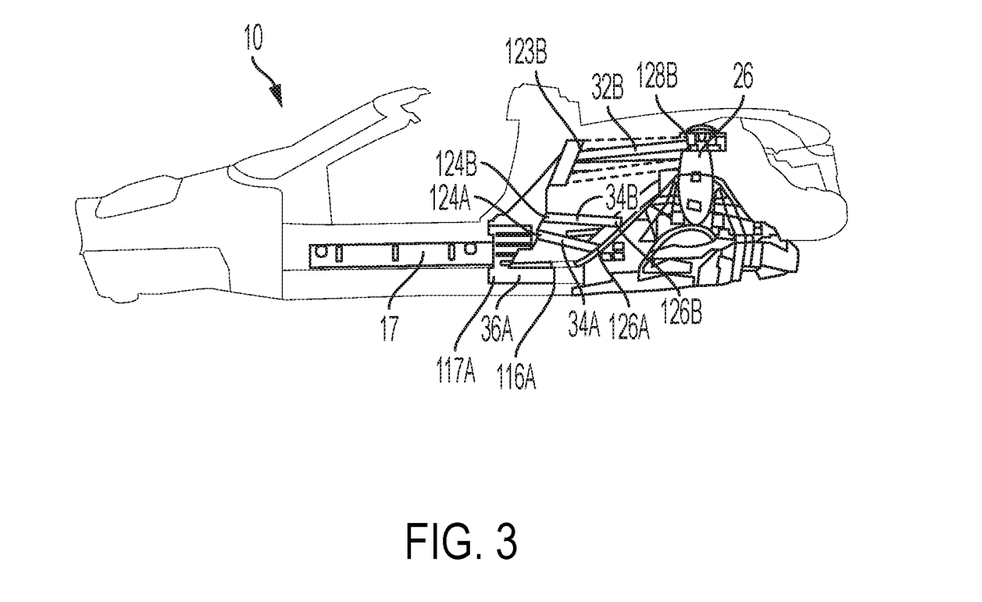
FIG. 3 is a schematic side partial view of the integrated vehicle body structure of FIG. 1, according to an embodiment.

Mid-engine convertible vehicle configurations, such as the configuration illustrated by vehicle 10, typically have limited torsional stiffness. Closed section center tunnels, such as center tunnel 17, increase vehicle torsional stiffness if the rear end twist at the shock tower 26 interface is efficiently transferred to the close section center tunnel 17. The vehicle 10, as best illustrated in FIG. 3, includes vehicle structural geometry defining three parallel load path pairs (that is, six total load paths) connecting the center tunnel 17 and the shock towers 26. The load transferring system shown in FIGS. 3-7 includes three levels (per side of the vehicle 10) of tunnel to rail shock structural members. The three pairs of structural members function as a vertical shear wall to efficiently transfer rear shock twist to the closed box section center tunnel. The combination of high integrity die castings with the load path geometry discussed below and bolt on extruded tube sections form four structural members that bridge between the top and middle of the center tunnel of the vehicle 10 to both the top and bottom of the rear shock structure. Two additional members complete the center torsional load transfer by connecting the lower tunnel corners to the rear cradle/rail interface. The load path geometry discussed herein provides an additional benefit of augmenting the transfer of rear barrier loads into the continuous closed sections at each corner of the center torsional load path.

A first load path between the center tunnel 17 and the shock towers 26 is defined by a pair of upper structural members 32A, 32B that extend in a first plane. The first load path is illustrated collectively as numeral 32 in FIG. 3. The first load path is an upper tunnel to rail load path including cast in beam section components in conjunction with a bolt on extrusion. As illustrated, the upper structural member 32B connects the upper tunnel via the cross-vehicle support member 23 at an upper tunnel connection point 123B to the shock tower 26 at a shock tower cap connection point 128B.

Figure 4:
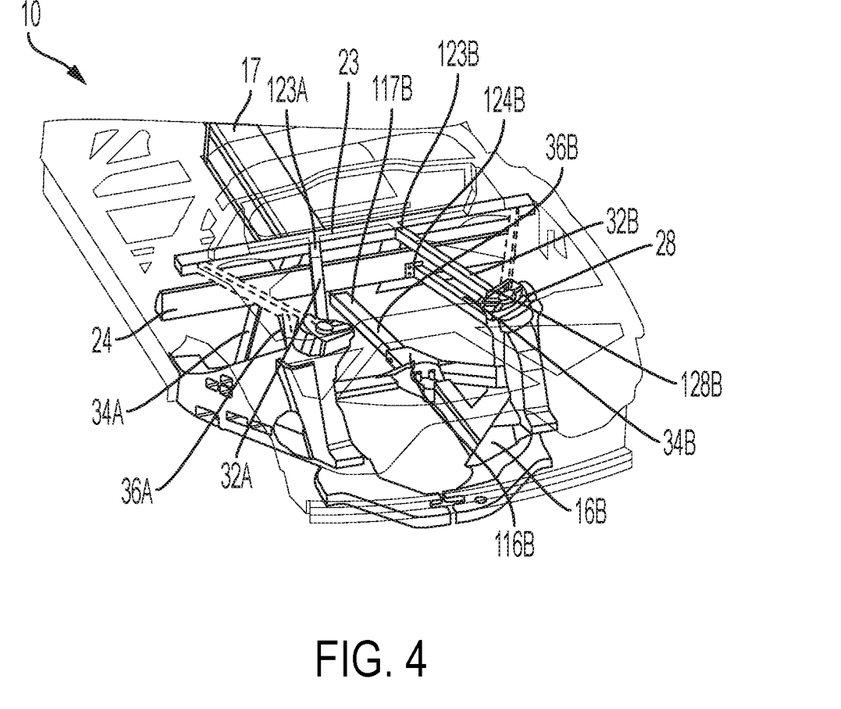
FIG. 4 is a schematic rear perspective partial view of the integrated vehicle body structure of FIG. 1, according to an embodiment.
Figure 5:
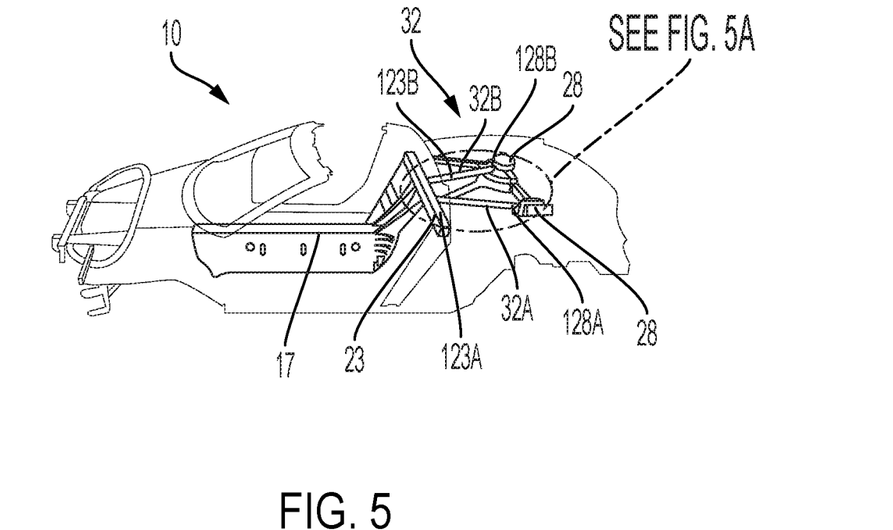
FIG. 5 is a schematic side perspective partial view of the structural members forming a first vehicle load path, according to an embodiment.
Figure 5A:
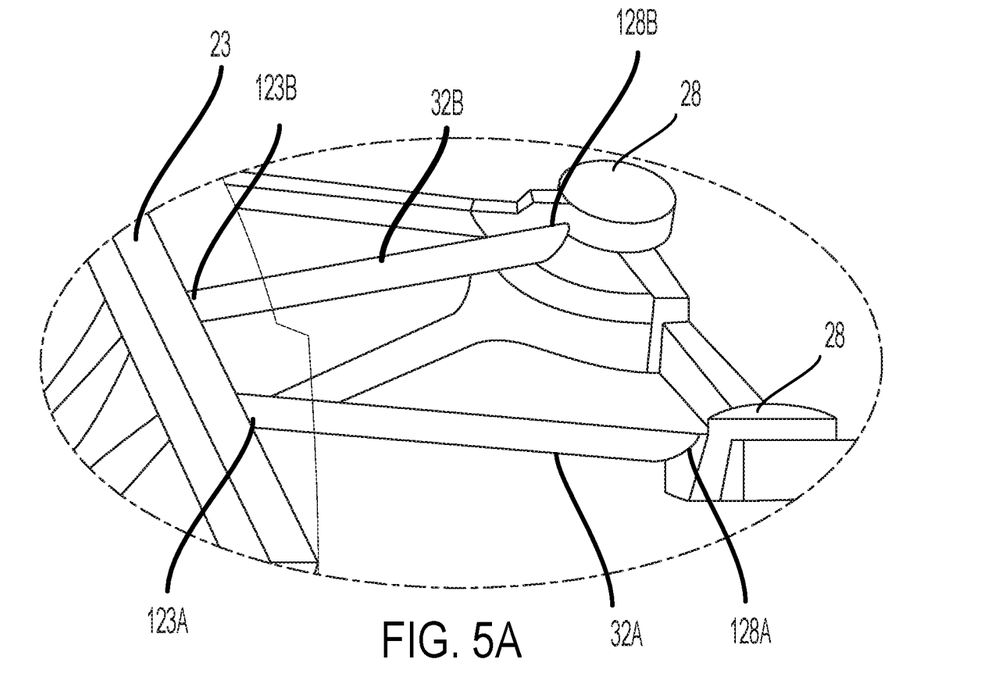
FIG. 5A is a schematic side perspective detailed view of one of the structural members forming the first vehicle load path, according to an embodiment.
Figure 6:
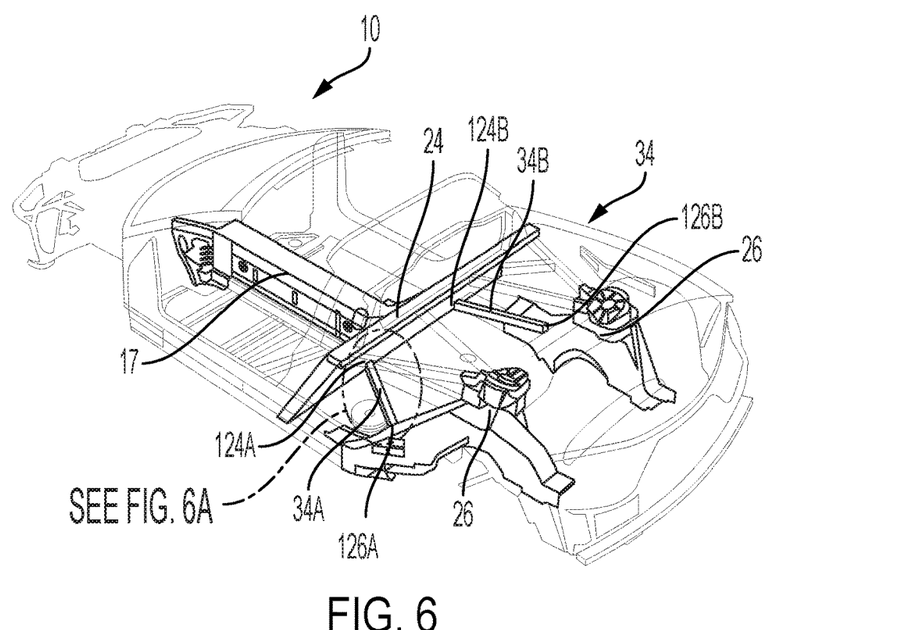
FIG. 6 is a schematic rear perspective partial view of the structural members forming a second vehicle load path, according to an embodiment.
Figure 6A:
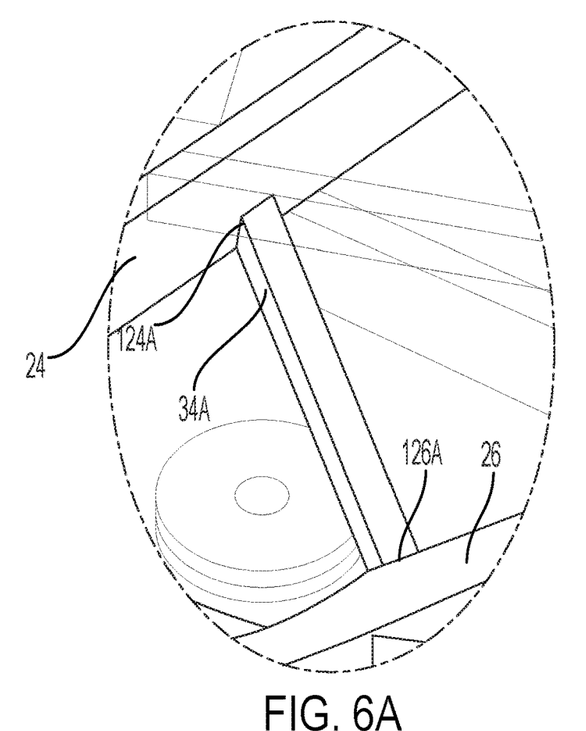
FIG. 6A is a schematic rear perspective detailed view of one of the structural members forming the second vehicle load path, according to an embodiment.
Figure 7:
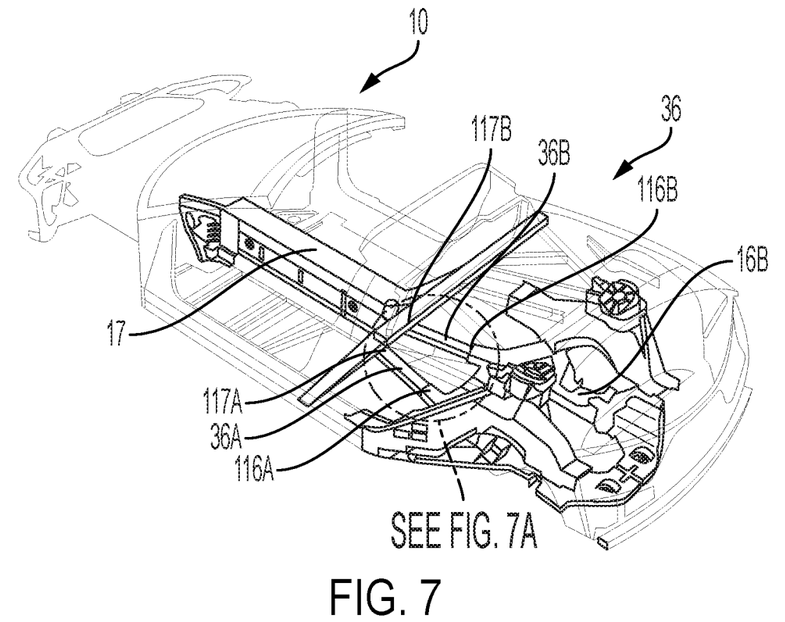
FIG. 7 is a schematic rear perspective partial view of the structural members forming a third vehicle load path, according to an embodiment.
Figure 7A:
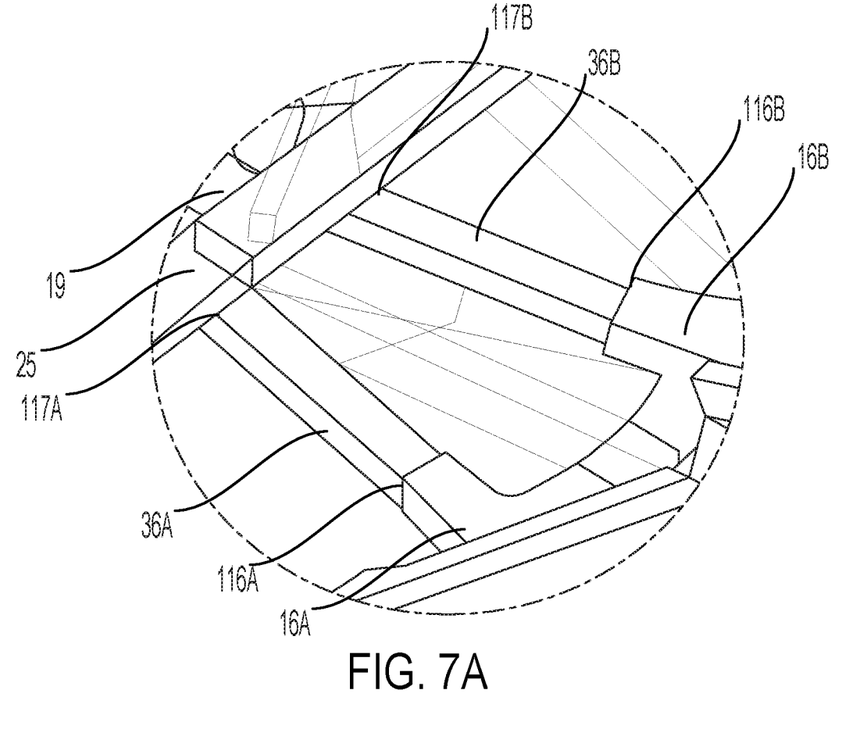
FIG. 7A is a schematic rear perspective detailed view of the structural members forming the third vehicle load path, according to an embodiment.

The upper structural member 32A similarly connects the upper tunnel via the cross-vehicle support member 23 to the other shock tower 26 as best illustrated in FIG. 4.

A second load path between the center tunnel 17 and the shock towers 26 is defined by a pair of middle structural members 34A, 34B that extend in a second plane separated from the first plane. The second load path is illustrated collectively as numeral 34 in FIG. 3. The second load path is a mid-tunnel to lower shock tower load path. The middle structural members 34A, 34B form part of the global vehicle structure and provide support as the primary fuel tank support structure. As illustrated, the middle structural member 34A connects the mid tunnel via the cross-vehicle support member 24 at a mid-tunnel connection point 124A to a lower shock tower connection point 126A. Similarly, the middle structural member 34B connects the mid tunnel via the cross-vehicle support member 24 at a mid-tunnel connection point 124B to a lower shock tower connection point 126B.

A third load path between the center tunnel 17 and the frame 16 is defined by a pair of lower structural members 36A, 36B that extend in a third plane separated from the first and second planes. The third load path is illustrated collectively as numeral 36 in FIG. 3. The third load path is a lower tunnel to rail load path that is removable to accommodate vehicle assembly. As illustrated, the lower structural member 36A connects the lower tunnel via the lower bulkhead support member 19 at a lower tunnel connection point 117A to the rail 16A at a rail connection point 116A. The lower structural member 36B similarly connects the lower tunnel via the lower bulkhead support member 19 at a lower tunnel connection point 117B to the rail 16B at a rail connection point 116B.

With reference to FIGS. 3, 4, 5, and 5A the pair of upper structural members 32A, 32B define the first load path indicated generally as numeral 32. The upper structural members 32A, 32B may have an extruded tubular aluminum construction with either a generally circular or rectangular cross-section. The tensile strength of the material used to form each upper structural member 32A, 32B may be in a range of 150-230 MPa.

As shown, each upper structural member 32A, 32B extends from the shock tower 26 through a respective one of the plurality of receivers 30 in the shock tower cap 28 to the bulkhead 22 and is fixed to each of the shock tower 26 and the bulkhead 22. In various embodiments, each upper structural member 32A, 32B is coupled to a first cross-vehicle support member 23 at connection points 123A, 123B and extends from shock tower cap connection points 128A, 128B in the shock tower cap 28. The shock tower cap connection points 128A, 128B are receivers contoured to provide clearance for and accept the upper structural members 32A, 32B. In various embodiments, an adhesive, such as an epoxy, is applied between the shock tower cap 28, the upper structural members 32A, 32B, and the shock tower 26 to bond the shock tower cap 28, the upper structural members 32A, 32B, and the shock tower 26 to each other and reinforce the vehicle body structure 14. In various embodiments, a mechanical fastener (not shown) such as a bolt, rivet, etc. is used to couple the upper structural members 32A, 32B to the first cross-vehicle support member 23 and to the shock tower cap 28. The specific number and location of the fasteners may be selected based on the desired stiffness of the connection and to supplement the adhesive used to couple the components.

With reference to FIGS. 3, 4, 6, and 6A the pair of middle structural members 34A, 34B define the second load path indicated generally as numeral 34. The middle structural members 34A, 34B may have an extruded tubular aluminum construction with either a generally circular or rectangular cross-section. The tensile strength of the material used to form each middle structural member 34A, 34B may be in a range of 150-230 MPa.

As shown in FIGS. 3, 4, 6, and 6A, each middle structural member 34A, 34B extends from a midpoint of the shock tower 26 to the bulkhead 22. In various embodiments, each middle structural member 34A, 34B is coupled to a second cross-vehicle support member 24 at mid tunnel connection points 124A, 124B and extends to lower shock tower connection points 126A, 126B of the shock towers 26. In various embodiments, an adhesive, such as an epoxy, is applied between the shock tower 26, the middle structural members 34A, 34B, and the second cross-vehicle support member 24 to bond the shock tower 26, the middle structural members 34A, 34B, and the second cross-vehicle support member 24 to each other and reinforce the vehicle body structure 14. In various embodiments, a mechanical fastener (not shown) such as a bolt, rivet, etc. is used to couple the middle structural members 34A, 34B to the second cross-vehicle support member 24 and to the shock tower 26. The specific number and location of the fasteners may be selected based on the desired stiffness of the connection and to supplement the adhesive used to couple the components.

As illustrated in FIGS. 3, 4, 7, and 7A the pair of lower structural members 36A, 36B define the third load path indicated generally as numeral 36. The lower structural members 36A, 36B may have an extruded tubular aluminum construction with either a generally circular or rectangular cross-section. In various embodiments, the lower structural members 36A, 36B may have a generally rectangular cross-section with a central support extending longitudinally through the lower structural members 36A, 36B. The tensile strength of the material used to form each lower structural member 36A, 36B may be in a range of 150-230 MPa.

With continued reference to FIGS. 3, 4, 7, and 7A each lower structural member 36A, 36B extends from a lower tunnel corner to the rail interface. The lower structural member 36A connects the lower tunnel at a lower tunnel connection point 117A to the rail 16A at a rail connection point 116A. The lower structural member 36B similarly connects the lower tunnel at a lower tunnel connection point 117B to the rail 16B at a rail connection point 116B. In various embodiments, a mechanical fastener (not shown) such as a bolt, rivet, etc. is used to couple the lower structural members 36A, 36B to the lower tunnel at the lower tunnel connection points 117A, 117B and to the rails 16A, 16B at the rail connection points 116A, 116B. The specific number and location of the fasteners may be selected based on the desired stiffness of the connection and to supplement the adhesive used to couple the components.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A structural arrangement for a vehicle, comprising:
a vehicle frame including a vehicle frame rail and a center tunnel defining a vehicle body axis;
a bulkhead arranged transverse to the vehicle body axis, the bulkhead coupled to the center tunnel;
a shock tower spaced apart from the bulkhead and fixed to the vehicle frame rail;
a first structural member extending from the bulkhead to the shock tower and fixed to each of the bulkhead and the shock tower, the first structural member extending along a first plane defining a first level;
a second structural member extending from the bulkhead to the shock tower and fixed to each of the bulkhead and the shock tower, the second structural member extending along a second plane separate from the first plane and defining a second level lower than the first level; and
a third structural member extending from the center tunnel to the vehicle frame rail and fixed to each of the center tunnel and the vehicle frame rail, the third structural member extending along a third plane separate from the first and second planes and defining a third level lower than the first and second levels;
wherein the first structural member defines a first load path between the center tunnel and the shock tower, the second structural member defines a second load path between the center tunnel and the shock tower, and the third structural member defines a third load path between the center tunnel and the vehicle frame rail.

2. The structural arrangement for the vehicle of claim 1, wherein the vehicle frame rail includes a first frame rail and a second frame rail spaced apart from and parallel to the first frame rail and each of the first and second frame rails extend parallel to the vehicle body axis.

3. The structural arrangement for the vehicle of claim 2, wherein the shock tower includes a first shock tower and a second shock tower, and the first shock tower is spaced apart from the bulkhead and fixed to the first frame rail and the second shock tower is spaced apart from the bulkhead and fixed to the second frame rail.

4. The structural arrangement for the vehicle of claim 3, wherein the first structural member includes a first upper structural member extending from the bulkhead to the first shock tower and fixed to each of the bulkhead and the first shock tower and a second upper structural member extending from the bulkhead to the second shock tower and fixed to each of the bulkhead and the second shock tower.

5. The structural arrangement for the vehicle of claim 3, wherein the second structural member includes a first middle structural member extending from the bulkhead to the first shock tower and fixed to each of the bulkhead and the first shock tower and a second middle structural member extending from the bulkhead to the second shock tower and fixed to each of the bulkhead and the second shock tower.

6. The structural arrangement for the vehicle of claim 3, wherein the third structural member includes a first lower structural member extending from the center tunnel to the first frame rail and fixed to each of the center tunnel and the first frame rail and a second lower structural member extending from the center tunnel to the second frame rail and fixed to each of the center tunnel and the second frame rail.

7. The structural arrangement for the vehicle of claim 1, wherein the center tunnel is a closed section center tunnel.

8. The structural arrangement for the vehicle of claim 1, wherein each of the first, second, and third structural members is an extruded tubular member.

9. The structural arrangement for the vehicle of claim 1, wherein the shock tower is a high-integrity aluminum die-casting.

10. An automotive vehicle, comprising:
a vehicle body structure having a vehicle body axis, a center tunnel, a bulkhead coupled to the center tunnel, and a vehicle frame rail coupled to the center tunnel, the center tunnel and the vehicle frame rail arranged along the vehicle body axis;
a first cross-vehicle member and a second cross-vehicle member arranged orthogonally relative to the vehicle body axis and the center tunnel, each of the first and second cross-vehicle members coupled to the bulkhead;
a shock tower spaced apart from the first and second cross-vehicle members and coupled to the vehicle frame rail; and
a load transfer system including:
a first structural member extending from the first cross-vehicle member to the shock tower and fixed to each of the first cross-vehicle member and the shock tower, the first structural member extending along a first plane defining a first level;
a second structural member extending from the second cross-vehicle member to the shock tower and fixed to each of the second cross-vehicle member and the shock tower, the second structural member extending along a second plane separate from the first plane and defining a second level lower than the first level; and
a third structural member extending from the center tunnel to the vehicle frame rail and fixed to each of the center tunnel and the vehicle frame rail, the third structural member extending along a third plane separate from the first and second planes and defining a third level lower than the first and second levels.

11. The automotive vehicle of claim 10, wherein the first structural member defines a first load path between the center tunnel and the shock tower, the second structural member defines a second load path between the center tunnel and the shock tower, and the third structural member defines a third load path between the center tunnel and the vehicle frame rail.

12. The automotive vehicle of claim 10, wherein the vehicle frame rail includes a first frame rail and a second frame rail spaced apart from and parallel to the first frame rail and each of the first and second frame rails extend parallel to the vehicle body axis.

13. The automotive vehicle of claim 12, wherein the shock tower includes a first shock tower and a second shock tower, and the first shock tower is spaced apart from the bulkhead and fixed to the first frame rail and the second shock tower is spaced apart from the bulkhead and fixed to the second frame rail.

14. The automotive vehicle of claim 13, wherein the first structural member includes a first upper structural member extending from the first cross-vehicle member to the first shock tower and fixed to each of the first cross-vehicle member and the first shock tower and a second upper structural member extending from the first cross-vehicle member to the second shock tower and fixed to each of the first cross-vehicle member and the second shock tower.

15. The automotive vehicle of claim 14, wherein the second structural member includes a first middle structural member extending from the second cross-vehicle member to the first shock tower and fixed to each of the second cross-vehicle member and the first shock tower and a second middle structural member extending from the second cross-vehicle member to the second shock tower and fixed to each of the second cross-vehicle member and the second shock tower.

16. The automotive vehicle of claim 15, wherein the third structural member includes a first lower structural member extending from the center tunnel to the first frame rail and fixed to each of the center tunnel and the first frame rail and a second lower structural member extending from the center tunnel to the second frame rail and fixed to each of the center tunnel and the second frame rail.

17. The automotive vehicle of claim 15, wherein the first middle structural member and the second middle structural member are configured as a primary fuel tank support structure.

18. The automotive vehicle of claim 10, wherein the center tunnel is a closed section center tunnel, each of the first, second, and third structural members are extruded tubular members, and the shock tower is a high-integrity aluminum die-casting.

19. A load impact management system for a vehicle having a vehicle frame including a vehicle frame rail and a center tunnel defining a vehicle body axis, the system comprising:
   a plurality of cross-vehicle support members extending from a first side of the vehicle to a second side of the vehicle opposite the first side of the vehicle;
   a shock tower spaced apart from the plurality of cross-vehicle support members and fixed to the vehicle frame rail;
   a first structural member extending from one of the plurality of cross-vehicle support members to the shock tower, the first structural member extending along a first plane and coupled to the shock tower at a first attachment point;
   a second structural member extending from one of the plurality of cross-vehicle support members to the shock tower, the second structural member extending along a second plane separate from the first plane and coupled to the shock tower at a second attachment point outboard of and lower than the first attachment point; and
   a third structural member extending from the center tunnel to the vehicle frame rail, the third structural member extending along a third plane separate from the first and second planes;
   wherein the first structural member defines a first load path between the center tunnel and the shock tower, the second structural member defines a second load path between the center tunnel and the shock tower, and the third structural member defines a third load path between the center tunnel and the vehicle frame rail.

20. The load management system of claim 19, wherein the plurality of cross-vehicle support members includes a first cross-vehicle support member, a second cross-vehicle support member parallel to the first cross-vehicle support member, and a third cross-vehicle support member parallel to each of the first and second cross-vehicle support members, the first, second, and third cross-vehicle support members forming a tiered structure connecting the first side of the vehicle with the second side of the vehicle.

* * * * *